United States Patent [19]

Christner et al.

[11] Patent Number: 5,412,518
[45] Date of Patent: May 2, 1995

[54] INDIVIDUAL MR TRANSDUCER HEAD/DISK/CHANNEL ADAPTIVE BIAS CURRENT SYSTEM

[75] Inventors: Jodie A. Christner; Earl A. Cunningham; Gregory J. Kerwin; Joe M. Poss, all of Rochester, Minn.

[73] Assignee: International Business Machines Corporation, Armonk, N.Y.

[21] Appl. No.: 168,630

[22] Filed: Dec. 16, 1993

[51] Int. Cl.⁶ ............................................. G11B 5/09
[52] U.S. Cl. ...................................... 360/66; 360/113
[58] Field of Search ................ 360/46, 66, 61, 65, 360/25, 113, 68, 31

[56]       References Cited
       U.S. PATENT DOCUMENTS

| | | | |
|---|---|---|---|
| 4,352,130 | 9/1982 | Hasegawa et al. | 360/66 |
| 4,405,953 | 9/1983 | Inomata et al. | 360/68 X |
| 4,422,109 | 12/1983 | Sampei et al. | 360/66 X |
| 4,433,349 | 2/1984 | Kimura | 360/66 |
| 4,611,253 | 9/1986 | Kamei et al. | 360/66 |
| 4,706,138 | 11/1987 | Jove et al. | 360/113 |
| 4,807,074 | 2/1989 | Kamo | 360/113 |
| 5,095,392 | 3/1992 | Shimazaki et al. | 360/40 |
| 5,119,243 | 6/1992 | Shimazaki et al. | 360/46 |
| 5,270,882 | 12/1993 | Jove et al. | 360/66 X |

*Primary Examiner*—Donald Hajec
*Assistant Examiner*—Thien Minh Le
*Attorney, Agent, or Firm*—Roy W. Truelson; Matthew J. Bussan; Robert W. Lahtinen

[57]                ABSTRACT

A method and apparatus is disclosed for adaptively controlling the biasing current applied to magnetoresistive (MR) read heads within a magnetic disk drive to provide optimized bias for each head/disk/channel component combination. An optimized bias current for each head is ascertained and stored on the disk surface at the time of manufacture. During each power up operation the values are transferred to random access memory which is accessed during the execution of each head switch command to apply bias current in accordance with the optimized value to the active MR head. Periodic reoptimization and updating of the stored values is effected by general error measurement circuitry that forms a part of the device control system and is invoked to perform the reoptimization upon the occurrence of an event such as a predetermined duration of power on operation subsequent to the last reoptimization procedure.

13 Claims, 4 Drawing Sheets

FIG. I

INDIVIDUAL MR TRANSDUCER HEAD/DISK/CHANNEL ADAPTIVE BIAS CURRENT SYSTEM

FIELD OF THE INVENTION

The present invention pertains to magnetic storage devices using magnetoresistive (MR), transducer head elements and more particularly to the control of biasing current for enhancing the performance of such transducer elements.

BACKGROUND

The dimensions of an MR head are becoming smaller and the tolerances are not reducing as quickly as the dimensions. In the design of a typical recent device, the tolerances on the MR stripe height represent a ±33% change, or with respect to the ratio of the highest to the lowest, represents a 2:1 ratio. Further, the tolerance of the width of the MR stripe (length in the direction of current flow) is ±20%. The tolerance of the thickness is ±10%. If these are considered independent variations, the total variation in the resistance of the element is about ±40%, or a high to low ratio of 2.33:1.

A problem resulting from the large dimensional variability is that with the normal biasing method, a large difference in power dissipation occurs with different heads within a device. In addition, current density varies significantly as the cross-section for the current (stripe height by thickness) also varies by a large amount. The basic failure mechanism is considered to be electromigration. Product life is inversely related to the cube of the current density, and exponentially to temperature (hot being bad). Since the normal biasing method uses a DC current that is fixed for all heads, the low stripe heights and thin layer thickness result in higher resistance and higher current density. The resulting power dissipation causes significantly more temperature rise than associated with a high and thick stripe. Thus temperature and current density compound and cause a much shorter life expectancy for the low stripe height and thin MR elements, compared to the higher and thicker elements.

Another consideration is that all the factors that make the resistance higher also make the the signal level higher. Thus the best signal to noise ratio occurs with the highest resistance heads. Thus, low stripe heights, thin layers and wider stripes cause good signal to noise ratios, while high, thick and narrow stripes produce poorer signal to noise ratios. A fixed bias current must then be a compromise between good signal and short life.

Another problem is that a good electronic signal to noise ratio depends upon preamplifier design. Preamplifier design has significant limits due to the reduction of voltage available and reduced power goals. Present designs typically have a single +5 volt supply (±5%). The variation in the resistance of the head also provides limits on the amount of bias current that can be used due to the voltage drop across the head and leads. This is limited by the multiple resistances and active elements that must split the available voltage to the amplifier. If too much current is run through a head of high resistance, the preamplifier stage will saturate and distort the signal, causing a degradation in performance.

A still further problem is the gradual resistance increase phenomenon (GRIP) which is related to the leads within the MR head. Recent data indicates this to be greater than previously expected with the addition of several ohms to the resistance over the life of the device. Thus, a design that is too close to the limit at manufacture may induce a saturation in the amplifier as the resistance increases late in product life, causing significant performance loss.

SUMMARY OF THE INVENTION

The current biasing problem in data storage devices including magnetoresistive transducer heads presented by the variability of components, the variability of amplifier circuits and the resistance increase phenomena that occurs over the lifetime of the device are addressed by a system that optimizes bias current for each head/disk/amplifier component set. Further, it is not necessary to compromise overall performance of the device at the time of manufacture since the bias current values are reset periodically throughout the operating life of the product.

The current bias values are determined and stored on the disk surface with other control information. When the drive is powered up, the bias values are transferred to random access memory to permit instantaneous access each time a different transducer head is used to read data from the media. Periodically, as a function of a predetermined duration of power on operation, the head/disk/amplifier component combinations are retested by the onboard error measurement circuitry to recalibrate the optimum bias current values for each component combination and update the stored current bias values. Thus, the device is self stabilizing throughout the product life and is significantly less prone to abrupt failure.

DETAILED DESCRIPTION

Figure 1:
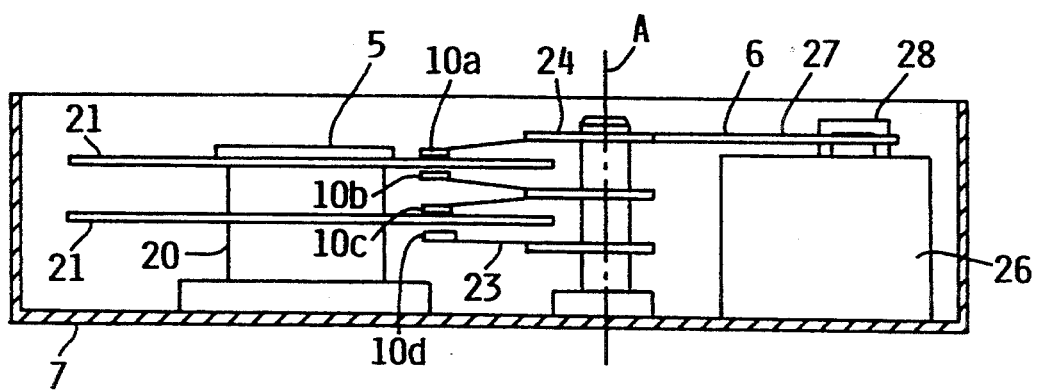
FIG. 1 is a schematic side elevation, partially broken away, of the principal mechanical parts of a typical rigid disk data storage device.

FIG. 1 is a schematic showing of a rigid magnetic disk data storage device. The spindle assembly 5 and the actuator assembly 6 are mounted on frame 7. The spindle assembly includes a spindle 20 to which disks 21 are clamped for unitary rotation. The rotatable spindle assembly 5 forms the rotor of a brushless DC spindle motor which commonly has the stator portion concentrically within the spindle rotor and supported on frame 7. The actuator assembly 6 includes the MR transducer heads 10a through 10d which are respectively carried by resilient flexure suspensions 23 and arms 24. The arms 24 are secured as an assembly for unitary rotation about the axis A to permit the transducer heads to be moved from one track location to another track location. The pivoting of the head/suspension assembly is effected by a voice coil motor (VCM) 26 wherein the voice coil 28 is carried by the extension 27 of the upper arm 24 and extends into a working gap through which a magnetic field passes, whereby a DC current in the voice coil pivots the head/arm assembly in one direction and a reversal of the DC current drives the head/arm assembly in the opposite pivotal direction.

The bias current problem is solved by a system that optimizes bias current on the head/disk/amplifier, for each set of components in a storage device, and allows reoptimization with life changes that may cause degradation. The solution has several improvements to operation not previously used. The need is for a method to determine how to set the bias. It is also required that the bias value for each of the heads be stored on the disk. The device transducer heads have current passed through them by a preamp and provision is provided to probe the head circuits to check for such problems as open circuit or short circuit. The voltage reading is placed in a data base and a program determines whether a current increase or a current decrease is required.

Figure 2:
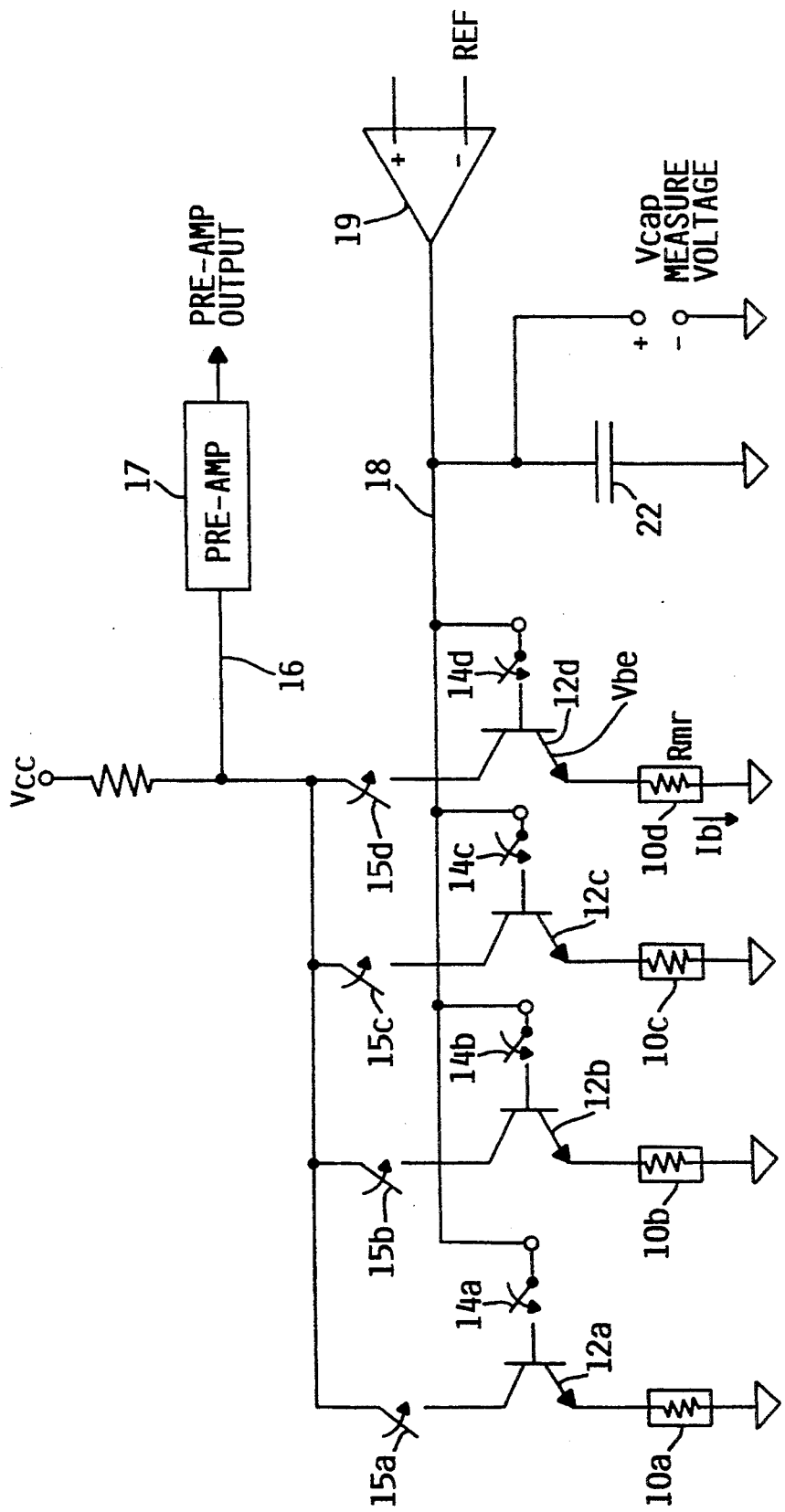
FIG. 2 is a circuit diagram showing the individual bias current control of multiple magnetoresistive heads of a disk drive device.

FIG. 2 shows a sequence of transducer heads 10a through 10d each respectively connected through a transistor 12a through 12d to a line 16 leading to a preamp circuit 17. The preamp output is connected to the device data channel. The addressed head is connected to the line 16 by the respective switch 15a through 15d and to the source of bias current on line 18 by the respective switch 14a through 14d. Although the switches 14a through 14d and 15a through 15d are illustrated schematically, it is to be understood that these functions are performed by switching circuits using semiconductor devices. The feedback control circuit 19 is used to supply the bias current while the capacitor 22 and the terminals in parallel therewith for measuring the voltage across the capacitor, Vcap, enable a determination of the MR head resistance:

$$Vcap = Ib\ Rmr + Vbe$$

$$Rmr = (Vcap - Vbe)/Ib$$

The MR head bias current is set as function of the MR head resistance.

However, the differences in tolerance between preamp modules is not taken into account, so the maximum current must then be limited to work with all preamp modules over the whole range of tolerances. A better optimum could be achieved if compensation was also made for the preamp circuits.

To do an equivalent signal to noise measurement of the system in normal operation, a generalized error measurement (GEM) capability as shown in U.S. patent application Ser. No. 922,591, filed Jul. 30, 1992, entitled "Error Measurement Circuit" and assigned to the same assignee, may be used. This GEM system is designed to provide a disk drive with on board capability to perform tests which in the past have been performed by connecting the data storage and recovery system to test equipment such as digital oscilloscopes and logic analyzers. One of the standard functions of the GEM circuit is to determine the mean squared error of the deviation of samples around their optimum value. This essentially provides a signal to noise measurement, since the data amplitude has been normalized to a given reference level at this point. The GEM circuits are presently used to determine the equalizer best fit for each head/disk combination. In the same way, it can be used to find the optimum bias current.

Figure 3:
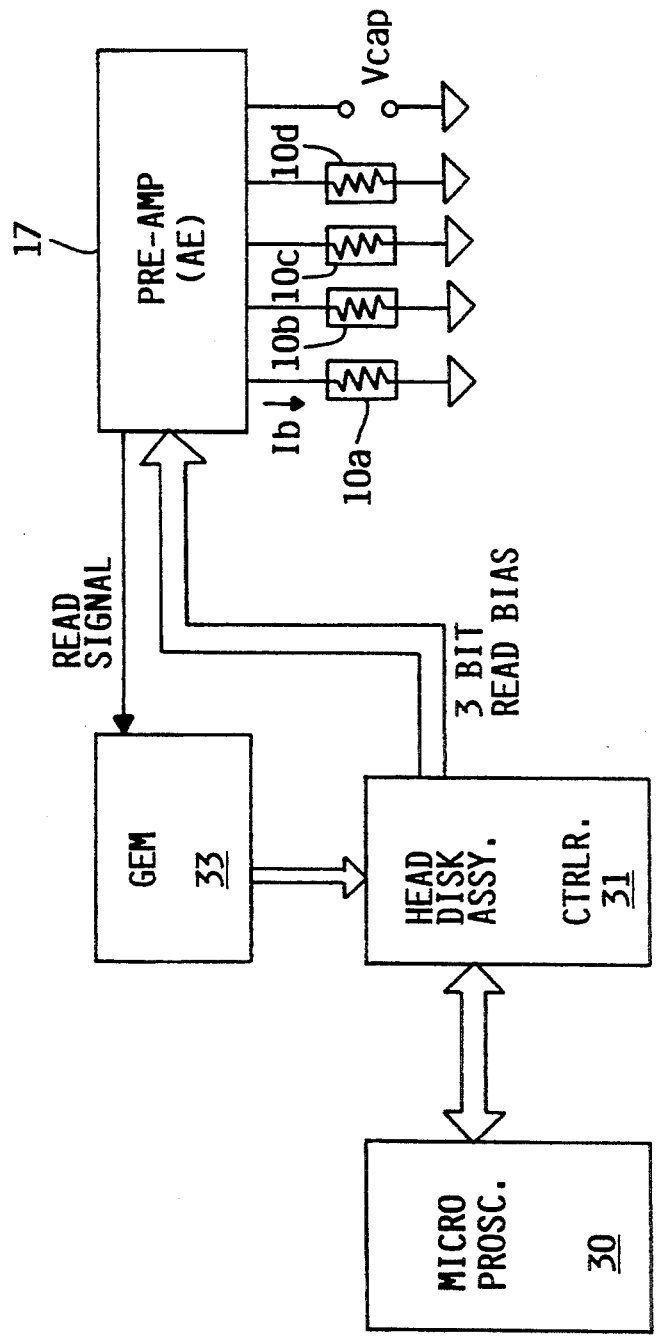
FIG. 3 is a schematic block diagram of the control structure used to implement the present invention.
Figure 4:
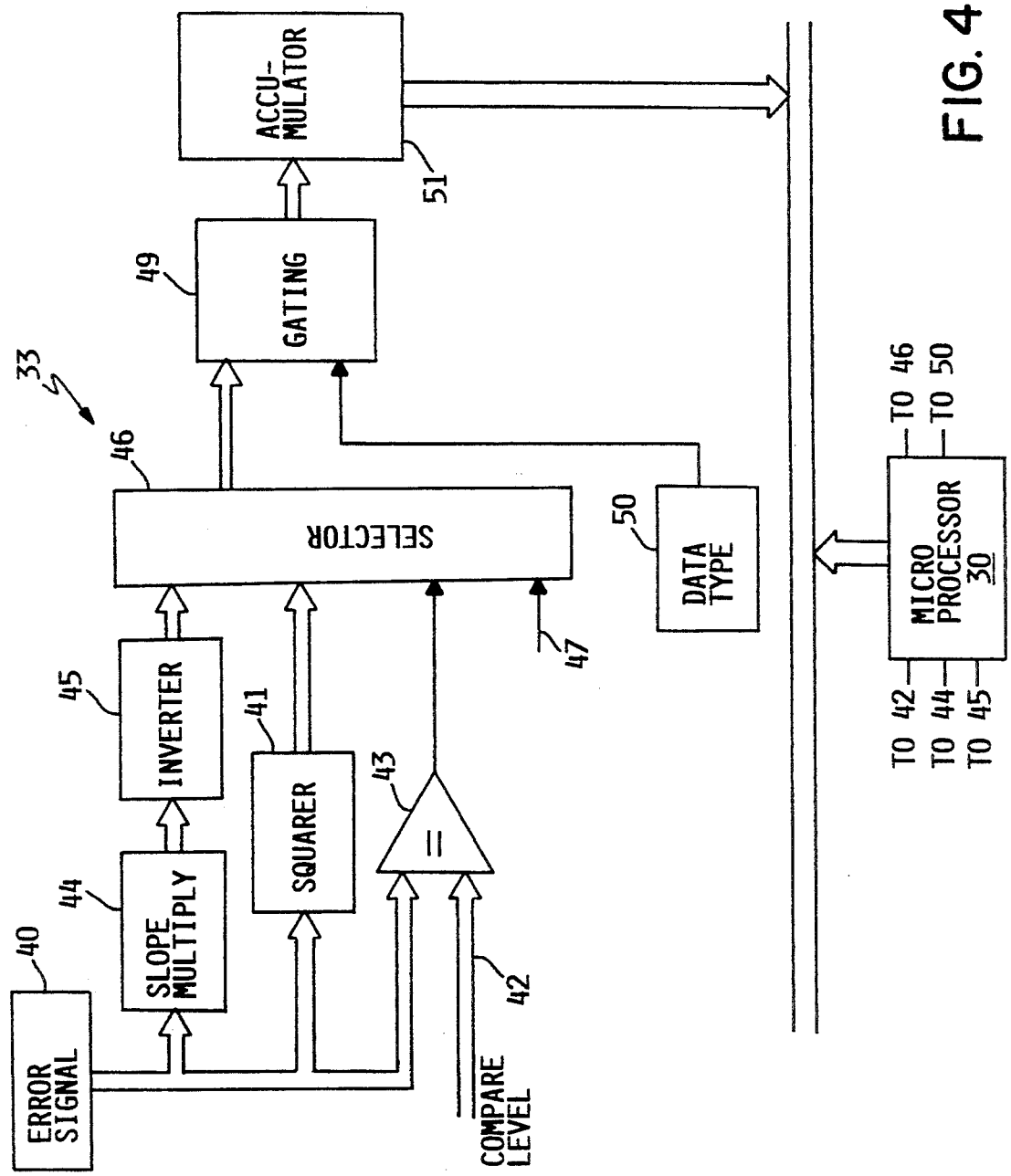
FIG. 4 is a block diagram showing a general error measurement circuit used to implement the present invention.

FIG. 3 shows a partial block diagram of a disk drive incorporating the invention using the GEM circuit and FIG. 4 is a block diagram of the GEM circuit 33. Control is exercised by the device microprocessor 30 and the head/disk assembly controller 31 which receives input from the error measurement circuits of GEM 33. In response to the error value processed by the GEM circuitry, the bias current is set by a three bit signal transmitted to the preamp circuitry 17 of the arm electronics. Typical values of current Ib in response to MR head resistance values are:

| Rmr (ohms) | Ib (mA) | Read Bias Bits |
|---|---|---|
| >40 | 6.5 | 0 0 0 |
| 35–40 | 8.0 | 0 0 1 |
| 30–35 | 9.5 | 0 1 0 |
| 25–30 | 11.0 | 0 1 1 |
| 20–25 | 12.5 | 1 0 0 |
| DRP | 14.0 | 1 0 1 |
| DRP | 15.5 | 1 1 0 |
| DRP | 17.0 | 1 1 1 |

The three highest values of bias current, Ib are used only during data recovery procedures (DRP) where momentary high current levels will not compromise MR head life. Higher or lower current values may be used for recovery. Typically, a higher value is used which does not exceed a predetermined percentage increase of the optimum value. The three higher values labeled DRP in the table will only be used for recovery procedures, but in the case of a head with a lower optimum bias current value, the DRP may be limited to a few increments above or below such optimum bias current level.

FIG. 4 is a block diagram that illustrates the GEM circuit 33 for carrying out the error measurements. Block 40 represents the generation of error value samples from the data samples. An error value sample is generated by calculating the difference between the expected value of the data sample and the value of the received data sample.

Error value samples are input to a first process path, a second process path and a third process path. Error value samples input to a first process path are squared by a squarer 41. Squarer 41 generates a signal output comprising the square of each error value sample. Error value samples are compared to a compare level 42 by comparator 43. Comparator 43 generates an output comprising a logical one when the input error value sample is greater or equal to compare level 42, and a logical zero when the input error value sample is less than compare level 42.

A third process path includes a multiplier 44 and an inverter 45. Error value samples input to the third process path may be processed by both multiplier 44 and inverter 45, or neither multiplier nor inverter 45. In addition, error value samples input into the third process path may not be processed by either multiplier 44 or inverter 45. Selection is made by microprocessor 30, depending on the test to be performed.

Multiplier 44 multiplies each error value sample by a slope of the signal stored in the data storage and recovery system. The slope of the stored signal associated with a data sample is multiplied by the error value sample generated from that data sample. The result of this multiplication is then input into inverter 45 if the inverter 45 is to be a part of this process.

Inverter 45 receives as its input either multiplied error value samples if multiplier 44 was included in the process, or the error value samples if the multiplier 44 was not included in the process. In response to an input of a consecutive number of error value samples or multiplied error value samples which are associated with a data type of zero, inverter 45 will invert the input by reversing the sign of the last error value sample or the last multiplied error value sample of the consecutive number.

Selector 46 receives a signal as an input from the first process path, the second process path, the third process path, or a source of level samples 47 of a logical data level. In a preferred embodiment, source of samples 47 provides a logical one as an input to selector 46. Microprocessor 30 uses selector 46 to pass the output signal of one of the process paths, or the source of level samples 47 to gate 49.

Once selector 46 has selected a signal generated by one of the process paths or sample source 47 as an input, selector 46 outputs the selected signal to gate 49. Gate 49 passes the selected signal in response to coincidence of the data type associated with a signal with a desired data type supplied by source 50.

The output of gate 49 is then accumulated in accumulator 51. The result now in the accumulator 51 may be accessed by microprocessor 30 within the data storage and recovery system. The result may then be utilized to identify a problem within the data storage and recovery system.

In the simplest case, it may be assumed that the MR head has a nice linear output signal with no aberrations or distortions, asymmetries or instabilities. If this were to be true for all bias currents, it would be desirable to have a very high current, since the S/N would continue to increase with increased bias current. However, it is then necessary to consider the preamplifier. The preamplifier has two main places in the first stage that can saturate and this is a function of the supply voltage available, the particular tolerances of some internal parts including resistors in the chain, and these also depend on temperature. The resistors in a module have a positive temperature coefficient and increase with temperature. The junction voltages of the transistor also change with temperature. Due to the changes, the onset of saturation of the preamplifier occurs at different amplitudes with different temperatures and supply voltage. In general, the lowest supply and the highest temperature are the worst case, or the saturation occurs at lower signal amplitude.

The two most sensitive points where saturation is likely to occur, are either in the portion containing the MR head, or the output portion of the first stage, containing the load resistor. Thus, even if the head has very low resistance, the amplifier will saturate at some bias current, at the output transistor and load resistor on the first stage. This determines the maximum current that can be used on any resistance head. If the head has a resistance higher than a critical value, then the amplifier will saturate from the voltage across the MR head, at a current less than the amount that saturates the output stage. Thus for example, if the head resistance was 1.5 times the critical resistance, the maximum current would be $\frac{2}{3}$ of the maximum current determined by the load resistor and transistor of the first stage.

The transistors in the amplifier are biased very close to the limit of good operation, in order to use the low supply voltage and maintain the desired properties. Considering saturation, the system is operating initially at a voltage fairly close to saturation. Thus, the changes considered are relatively small, in many cases only a few tenths of a volt. It is this that makes the saturation characteristics relatively soft. This means that the distortion of the amplifier rises fairly smoothly with increased signal amplitude.

The optimum current in the "simple" case, is found by analyzing two effects, increased signal to noise (S/N) with increased bias and increased distortion with bias, to cause an optimum to occur. The increased S/N is relatively linear. The distortion tends to increase quadratically, and this eventually causes a faster degradation than the linear increase in S/N. The amount of distortion is related to the amplitude of the magnetic flux entering the MR head. There is then a rounded curve of error rate performance with bias current, with an optimum error rate obtained at the compromise current.

The optimum bias current is not a fixed value, since the supply voltage may change or the temperature may change. Over the range of temperature and supply voltage, it is desirable that the best overall error rate be maintained. The best point would be one where the lowest supply and highest temperature would be causing the error rate to be slightly worse than the optimum, since that operating point will not occur very often. In test it is not likely that temperature will be controlled to the highest possible temperature. It is thus necessary to provide some additional stress to compensate for the test not being done at the highest temperature. In order to determine the optimum point, it is necessary to obtain measurements on how fast the performance degrades with voltage, temperature, and current, for both cases of the output transistor limiting bias current, and for the MR head resistance limiting the bias current.

A first element in adjusting to reality is to add the effect of the MR head nonlinearity. Some saturation of the signal peaks is obtained resulting from being biased on an "S" shaped side of the bell shaped resistance versus input flux. Normally, the input flux is low enough that if the bias is optimally centered, the curve is very linear. If the bias is offset, then positive peaks or negative peaks may be reduced in amplitude. This is expressed as amplitude asymmetry. Asymmetry causes a degradation in performance, so large asymmetries are "bad".

The bias of the head is obtained, first by a hard bias (permanent magnet) at each end of the stripe, which provides a magnetic field in the direction of current flow through the stripe. A soft adjacent layer of the MR section itself provides a magnetic bias "circularly" up through the soft adjacent layer and down through the MR stripe. This field in the MR points down toward the media surface. The combination of these two, and some other effects, gives a bias angle of the domains about midway between the two bias fields. Although the soft adjacent layer is supposed to be saturated, there is still some variation of the bias field with bias current. Therefore, the bias current has some influence on the bias angle and hence on asymmetry.

It may be considered that if the bias current is varied for different stripes, the asymmetry would be aggravated. This is not correct, the asymmetry will actually be improved. In an example where one stripe height is twice that of another, results can be compared. The bias from the hard bias magnets in each case is the same. However, if the same current is used in the high stripe as the low stripe, the same number of amp-turns of magneto-motive force will drive the flux around the "loop" of soft adjacent layer and the MR layer. However, if the same bias field is wanted from the higher stripe as for the lower stripe, twice the amp-turns are needed, since each portion of the loop is twice the distance. The distance between the layers is very small compared to stripe height. Thus about twice the current is present in the high stripe compared to the low stripe to maintain the same bias angle. In this way, it can be seen that it is a fixed current used in different stripe heights that is responsible for pulling the asymmetry off the optimum value. Setting the currents nearer to the value that gives equal amp-turns will cause less variation in asymmetry, and less performance loss on that basis.

Even with the improvement that the adjustable bias current provides, there will still be a variation in asymmetry for different heads. In this case the distortion of the waveform from the asymmetry and from the amplifier saturation will add. In general, these distortions are not uncorrelated. The asymmetry basically distorts one polarity of peak. Also, it is normal that only one polarity of peak will be distorted in the amplifier since both polarities will normally not have identical stresses in the circuit. If the circuit and the asymmetry both hit the same polarity peak, the result will be a more rapid degradation. If they hit opposite peaks, there can actually be some improvement before degradation. When both peaks are reduced by a comparable amount it still has some degradation, but does not generate an offset which can be more severe than the higher order distortion.

When the GEM circuit takes the effective S/N measurement of a signal, it will automatically compare the total distortion of the signal, and will indicate the selection of optimum current for these conditions.

The amount of flux output from the disk will influence the amount of asymmetry seen in the signal, since a higher flux output will drive further into nonlinearity in the transfer function of the head. Since the adjustment of the bias current reduces the range of asymmetry, then the amount of flux from the disk may be increased. This can allow more amplitude of signal over all heads without causing more asymmetry than is presently seen.

With respect to heads that have some asymmetry, the disks that have lower output and thus lower signal, will have less asymmetry of the resulting output voltage compared with the higher flux output of the disk. The optimum bias current in the case of a lower flux output disk will generally be higher than for a high output disk. This means that the system will provide a better signal versus asymmetry trade off covering the disk variations in addition to head and amplifier variations.

If there exists a "stable" instability, the GEM circuit will pick the best place for the bias current. Since combinations of signal flux and bias flux will trigger instabilities, then in some cases, the instability will make continual distortions in the waveform and seriously degrade performance. However, if the bias field is changed one way or the other, so that the strength of the field is not enough to cycle the instability over the sticking point, the waveform will be stable and the performance will be good. This is the intent in using the changes in bias current for data recovery procedures. The result is that with the GEM measurement of effective S/N, the optimum bias is determined at the best operating conditions, and will automatically be shifted off from problems, such as high asymmetry or from instabilities.

The use of the present invention reduces variation in asymmetry and can thus allow a higher output flux from the disk, compared to standard designs. The invention also self compensates for asymmetry as a function of disk output, so as to maintain the best signal to noise ratio for all components. The invention also works with other biasing schemes since it is a total optimizing system.

If the bias current selected at the time of manufacture is to be used for the life of the product, then the bias current must be set to a compromise value calculated to accommodate future changes in the head/disk/channel combination parameters. This would diminish the advantage of the invention by decreasing the present performance of the MR read transducer system. The optimal performance can be maintained over the product life as follows. Periodically, as for example following each hour of power on operation, an error measurement circuit which forms a part of the drive circuitry, invokes a test sequence for measuring error values with respect to each of the head/disk/channel component combinations. This test sequence reoptimizes the bias current values and replaces present values with the new values where required. Typically, the bias current values can be selected from a table, such as that shown above in the discussion of FIG. 3. Such a table may include any number of graduated values. Thus, the bias current may always be selected to optimize performance under present conditions. The optimization procedure can theoretically provide about a factor of two improvement in signal to noise ratio. Some of the advantage may be traded for increased reliability.

The adaptive MR head bias current control is effected by accessing each head at the time of manufacture and determining an optimized bias current for each head/disk/channel component combination and storing such values on the disk surface portion provided for the storage of device control information. As a part of the disk drive power up sequence, low bias currents are initially used in attempting to read the stored optimum bias current values. If necessary, the initial values are increased to a nominal value, but not so high as might damage a low stripe height head. After the stored bias current values are read, they are transferred to random access memory within the drive. During operation, each time a head switch command occurs, the bias current values are accessed and the head becoming active is biased with the current value indicated.

While the invention has been particularly shown and described with reference to a preferred embodiment, it will be understood by those skilled in the art that various changes in form and details may be made therein without departing from the spirit and scope of the invention.

What is claimed is:

1. In a magnetic data storage device having data recorded in tracks on a media surface and including at least one magnetoresistive (MR) transducer read heads, the method of adaptively controlling the read head bias current comprising determining an optimized bias current value for each MR head;
   storing said optimized bias current values;
   supplying the active MR head with a bias current in accordance with the stored value:
   periodically redetermining said optimized bias current value for each MR head; and
   revising the stored bias current values to correspond with the redetermined optimized bias current values.

2. The adaptive control method of claim 1 wherein said step of storing bias current values comprises storing said values on a disk media surface and said method further comprises the step of transferring said bias current values from disk storage to random access memory during the power up sequence of the device.

3. The adaptive control method of claim 2 wherein said step of supplying the active MR head with a bias current comprises accessing the bias current value in said random access memory on the occasion of each head switch command and supplying a bias current in accordance with the stored value.

4. In a magnetic data storage device having data recorded in tracks on a media surface and including at least one magnetoresistive (MR) transducer heads, wherein an optimized bias current value is stored with respect to each MR head/media component combination, the method of adaptively controlling the read head bias current comprising supplying the active MR head with a bias current in accordance with the respective stored bias current value;

periodically redetermining the optimized bias current value for each of the plurality of MR heads; and revising said stored bias current values to correspond with the redetermined optimized bias current values.

5. The adaptive control method of claim 4 wherein said data storage device has said optimized bias current values stored on a disk media surface and further comprising the step of transferring the bias current values from the disk surface to active storage within said storage device during the power up operation.

6. The adaptive control method of claim 4 wherein the step of redetermining the optimized bias current values is invoked after ascertaining that a predetermined period of power on operation of said device has elapsed since the immediately preceding reoptimization step occurred.

7. A magnetic disk data storage device comprising
at least one magnetic disk storage medium:
at least one magnetoresistive (MR) transducer read head for reading data stored in tracks on the surface of said at least one disk medium;
means for determining optimized values of bias current for each of said at least one MR read head:
means for storing said optimized value(s) of bias current;
means for applying a bias current to the active MR read head in accordance with the stored bias current value for that head; and
means for invoking said means for determining optimized values of bias current on the occurrence of the event, whereby the stored optimized bias current values are updated with the present optimized bias current values upon each occurrence of said event.

8. The magnetic disk data storage device of claim 7 wherein said event comprises a predetermined duration of power on operation of said storage device subsequent to the immediately prior optimization sequence.

9. The magnetic disk data storage device of claim 7 wherein said means for storing optimized values of bias current comprises storing said optimized values on a disk surface portion containing device control information and said device further comprises means for transferring said optimized values of bias current from the disk surface storage to random access memory within said device during the power up procedure.

10. The magnetic disk data storage device of claim 7 wherein said means for determining optimized values of bias current comprises a general error measurement circuit which is invoked for bias current optimization during the first idle period following the occurrence of said event.

11. A magnetic disk data storage device comprising
at least one rigid disk magnetic storage medium;
at least one magnetoresistive (MR) transducer read head for reading data stored in tracks on the surface of said at least one storage medium;
means for determining optimized values of bias current for each of said at least one MR read heads based on selected parameters;
means for storing said optimized values of bias current;
means for applying a bias current to the active MR read head in accordance with the stored bias current value for that head; and
means for invoking said means for determining optimized values of bias current upon the occurrence of an event and altering the bias current value applied to said head in accordance therewith.

12. The magnetic disk data storage device of claim 11 wherein said event comprises a read error condition.

13. The magnetic disk data storage device of claim 12 wherein said means for storing optimized values of bias current comprises storing said optimized values on a disk surface portion containing device control information and said device further comprises means for transferring said optimized values of bias current from the disk surface storage to random access memory within said device during the power up procedure.

* * * * *